United States Patent [19]
Harmsen

[11] Patent Number: 5,786,442
[45] Date of Patent: Jul. 28, 1998

[54] POLYESTER MIXTURE, ITS PREPARATION AND USE

[75] Inventor: Johan Harmsen, Gouda, Netherlands

[73] Assignee: Unilever Patent Holdings B.V., Rotterdam, Netherlands

[21] Appl. No.: 601,130

[22] Filed: Oct. 23, 1990

[30] Foreign Application Priority Data

Oct. 23, 1989 [NL] Netherlands ............... 8902625

[51] Int. Cl.$^6$ ............................................. C08G 63/54
[52] U.S. Cl. .................. 528/295.3; 528/272; 528/295.5; 528/302; 528/308; 528/308.6; 528/501; 525/7; 525/32.1; 525/35; 525/437; 525/445; 264/239
[58] Field of Search .................. 528/272, 295.3, 528/295.5, 302, 308, 308.6, 501; 525/7, 32.1, 35, 437, 445; 264/239

[56] References Cited

U.S. PATENT DOCUMENTS

| | | | |
|---|---|---|---|
| 4,504,652 | 3/1985 | Widder et al. | 528/480 |
| 4,582,895 | 4/1986 | Peerman et al. | 528/295.3 |

FOREIGN PATENT DOCUMENTS

| | | |
|---|---|---|
| 0245665 | 11/1987 | European Pat. Off. . |
| 1593577 | 10/1970 | Germany . |
| 3503330 | 8/1986 | Germany . |
| 01294730 | 11/1989 | Japan . |
| 840056 | 6/1981 | U.S.S.R. . |
| 1080479 | 8/1967 | United Kingdom . |

OTHER PUBLICATIONS

Chemical Abstracts, vol. 89, No. 24, 11th Dec. 1978, p. 23.
Patent Abstracts of Japan, vol. 14, No. 77(C-688) [4020], Feb. 14, 1990.
SPE Journal, vol. 19, No. 9, Sep. 1963, pp. 984–991.

*Primary Examiner*—Samuel A. Acquah
*Attorney, Agent, or Firm*—Pillsbury Madison & Sutro LLP

[57] ABSTRACT

A polyester mixture is prepared composed of a diol, a dicarboxylic acid and optionally a monofunctional compound as a chain stopper, in which there is less than 3 wt. % of compounds having a molecular weight of up to 800. The process preferably involves stripping off volatile components from the mixture, for example by molecular distillation. The mixture may be used for forming shaped plastic objects for use in car interiors.

7 Claims, 2 Drawing Sheets

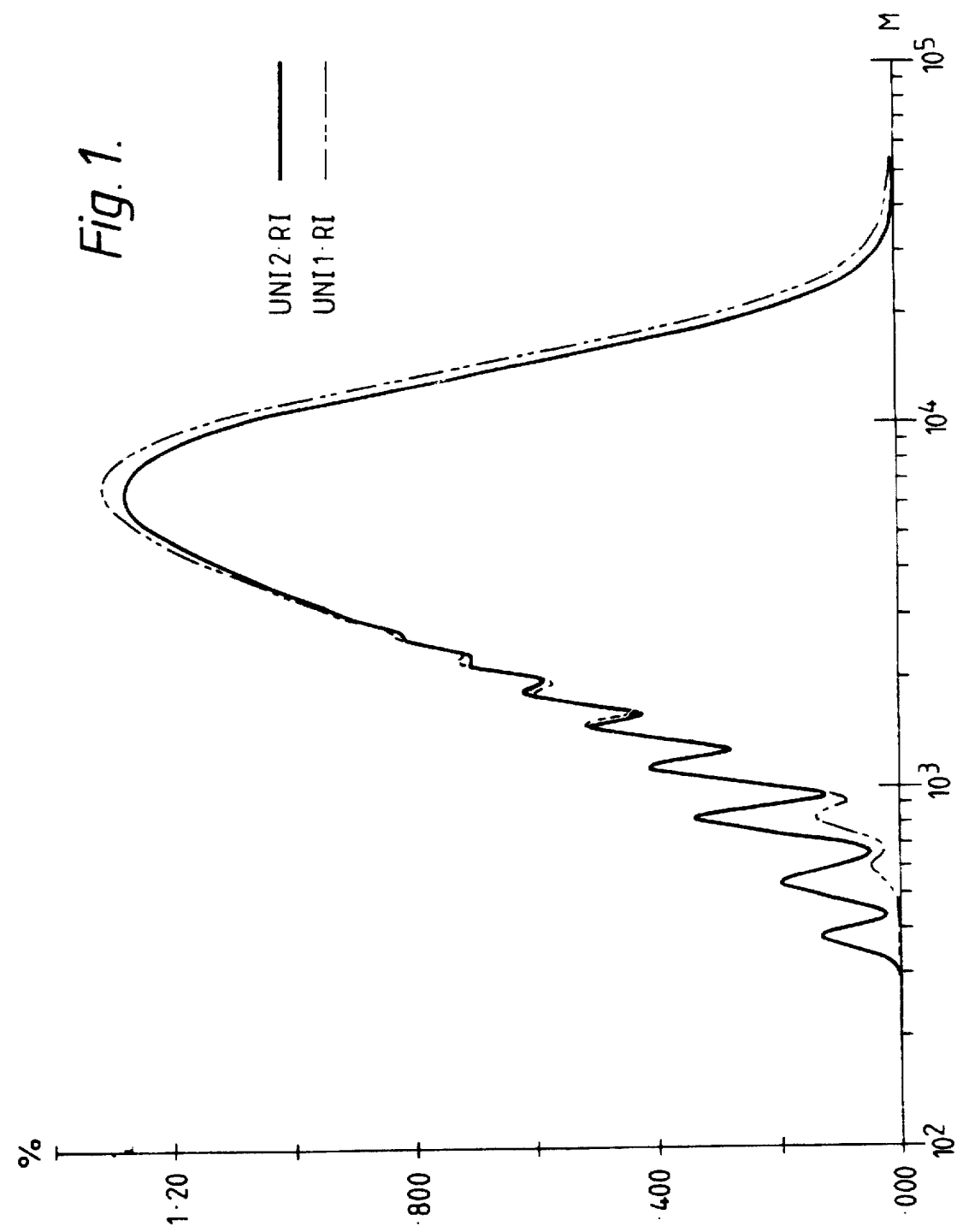

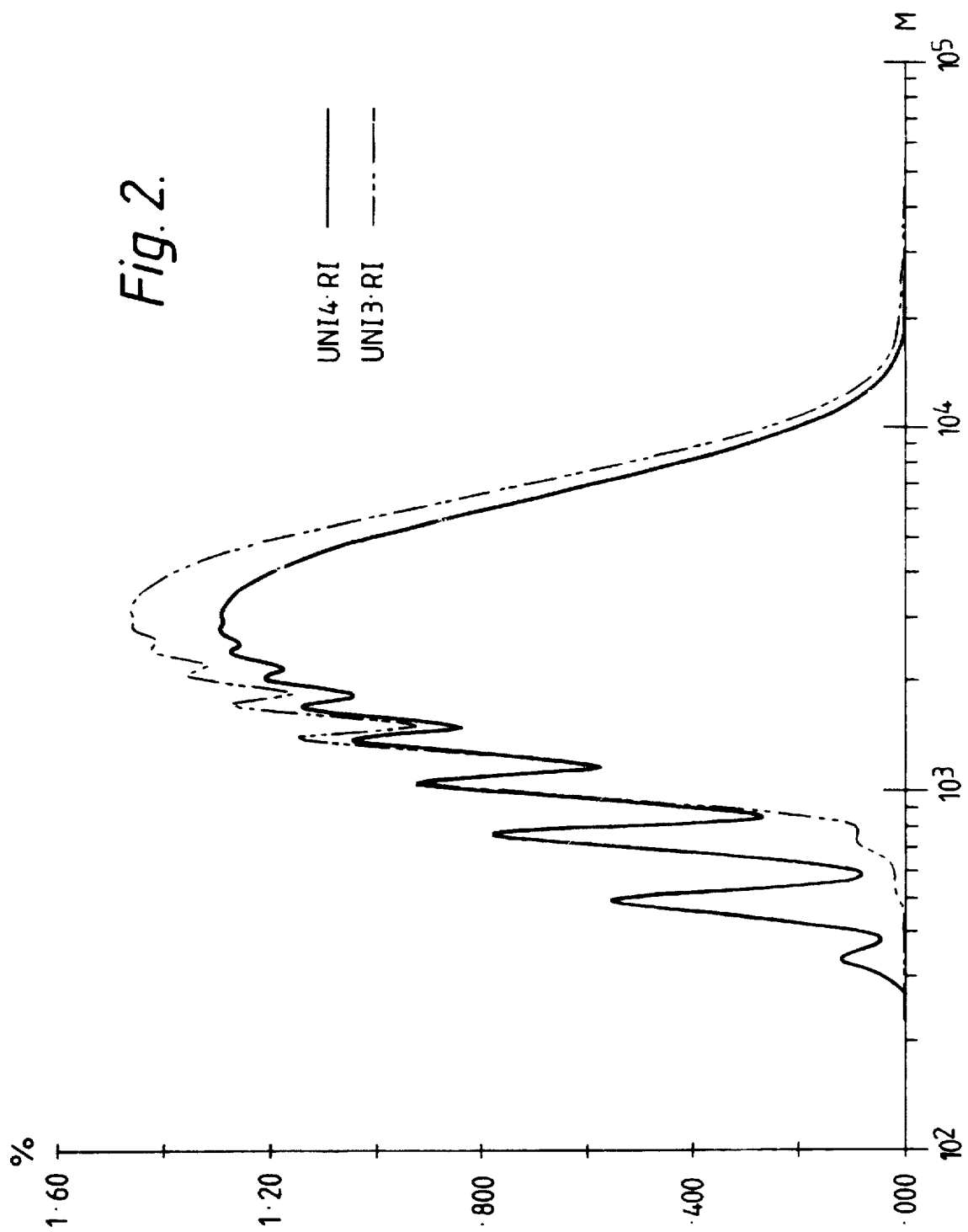

5,786,442

POLYESTER MIXTURE, ITS PREPARATION AND USE

The present invention relates to an improved polyester mixture, as well as to its preparation and use. More specifically, it relates to a polyester mixture containing of approximately equivalent quantities of at least:

a) one $C_2$–$C_7$ diol b) one $C_4$–$C_{45}$ dicarboxylic acid, and c) one optional monofunctional $C_4$–$C_{20}$ compound, acting as a chain stopper, where the polyester mixture obtained has an acid value of less than 5 and a hydroxyl value of less than 35. These polyester mixtures are widely used as polymeric plasticizers in plastics such as polyvinyl chloride.

Although these polyester mixtures have a relatively high molecular weight, they are still subject to migration in the plastic, and can also evaporate and exude from it. This evaporation is particularly undesirable, because the evaporating polyesters can entrain other substances with them, which then form a deposit elsewhere. This can happen especially inside cars, where the evaporation of these components occurs mainly when the temperature inside the vehicle rises greatly in the sun, whereas the windscreen and the windows remain relatively cold, so that a layer of greasy blue wax is deposited on these inside surfaces, which is all the worse for being difficult to remove.

The attempt to eliminate this undesirable phenomenon has led to the development of special plasticizers such as the trimellitates of e.g. octanol, which have a relatively low volatility. However, these esters still undergo migration in the plastic, and in addition, they are quite expensive.

It is known from Soviet Patent Specification SU-A No. 840,056 to take polyesters prepared from glycols and dicarboxylic acids and free them from the low-molecular by-products by distilling them with $C_1$–$C_6$ alcohols at 80°–140° C. under a pressure of 1–40 mm Hg. By-products with a molecular weight of up to about 400 can be removed in this way.

German Patent Specification (DE-A) No. 1,593,577 describes a method for the treatment of high-molecular esters with alkali metal or alkali earth metal alkoxides, followed by the thin-film vacuum distillation of the resulting esters. The distillate, which does not suffer any appreciable thermal decomposition during this process, can then be used as a polymeric plasticizer or synthetic lubricant.

Both the conventional polyester mixtures and those according to the present invention are composed of approximately equivalent quantities of at least:

a) one $C_2$–$C_7$ straight-chain or branched and preferably aliphatic diol, such as ethylene glycol, propylene glycol, neopentyl glycol, butane-1,3-diol, butane-1, 4-diol and hexane-1,6- diol;

b) one $C_4$–$C_4$ straight-chain or branched and preferably aliphatic dicarboxylic acid, such as adipic, sebacic, azelaic, phthalic, isophthalic and terephthalic acid, as well as $C_{36}$–$C_{44}$ dimer acids; and c) an optionally present $C_4$–$C_{20}$ monofunctional compound acting as a chain stopper in the form of either a monohydric alcohol such as butanol, monocarboxylic acid, such as valeric, caproic, pelargonic, myristic or stearic acid.

The term "approximately equivalent quantity" covers an up to about 5% excess, and it is usually the alcohol that is used in excess. However, a larger excess of up to about 35 Eq-% of alcohol is introduced when making up the reaction mixture, but part of it is stripped off during the re-esterification. The final polyester mixture according to the present invention preferably has an acid value of under 3 and a hydroxyl value of under 20.

The polyester prepared according to the present invention has the composition specified above but is free of the disadvantages resulting from a high volatility, exhibits little migration, and differs from the formulations known so far by containing less than 3 wt. % (and preferably less than 1.5 wt. %) of compounds with a molecular weight of up to 800.

We are aware of JP 01294730 (Mitsubishi) published 28 Nov. 1989, in which the level of low molecular weight compounds is reduced by molecular distillation to as low as 4.2% (see Example 4).

The polyester mixture according to the present invention has an average molecular weight of at least 1000, such as at least 1500, to less than 10,000, preferably less than 7,000, most preferably less than 4000. This is its number-average molecular weight, determined on the basis of the amount of monofunctional material present per unit weight of polyester, and on the basis of the acid and hydroxyl value. From the point of view of the ease of processing, and especially the viscosity, it is best if the polyester mixtures have a molecular weight of less than 5000, preferably less than 3000, and sometimes even below 2000.

In this way, the polyester mixture according to the present invention can also be regarded as a conventional polyester mixture from which a 4–25 wt. % fraction of lower esters with a molecular weight of up to 800 has been eliminated.

The present invention also relates to a process for the preparation of a polyester mixture composed of approximately equivalent amounts of at least:

a) one $C_2$–$C_7$ diol b) one $C_4$–$C_{45}$ dicarboxylic acid, and c) an optional monofunctional $C_4$–$C_{20}$ compound acting as a chain stopper, and having an acid value of less than 3 and a hydroxyl value of less than 35, by esterifying and/or re-esterifying a reaction mixture and possibly stripping off the volatile components (especially the used mono- and di-alcohols) from it, so that finally the polyester with the above composition is obtained, from which 4–25 wt. % of the most volatile ester constituents is then removed.

The most highly volatile ester constituents are preferably removed by molecular distillation carried out by the thin-film method under a high vacuum of eg. 0.005 mm Hg at a temperature of eg. 225° C. The most volatile ester constituents can also be removed by supercritical extraction.

The invention also relates to a process for the preparation of plastic compositions, particularly those based on polyvinyl chloride, by incorporating in them 10–40 wt. % of a polyester mixture according to the present invention, this amount being calculated on the final plastic composition. The polyester mixture according to the present invention has a low volatility, good processing characteristics, a light colour and a high thermal stability.

The present invention also relates to the resulting plastic compositions, preferably those based on polyvinyl chloride, which contain 10–40 wt. % of a polyester mixture according to the present invention. These plastic compositions may be made in the form of eg. extrudates, granules or powders.

In addition to the polyester plasticizer according to the present invention, the plastic composition can also contain the customary other constituents, such as stabilizers and mould release agents.

The present invention also relates to shaped plastic objects that can be used in particular for structural purposes in car interiors and which partly or wholly consist of a plastic comprising 10–40 wt. % of the polyester mixture according to the present invention. Particularly good results are obtained when the present invention is used to produce shaped plastic objects for use as dashboard panels, parcel shelves behind the back seats, inside door panels, and other interior covering or facing materials. The formation of a blue waxy layer on the inside surface of the windscreen and the windows of cars is considerably reduced in this way. The shaped plastic objects can also be used for food packaging.

The following examples are intended to illustrate the present invention.

EXAMPLE 1

A mixture having the following composition was made up, where the amounts are specified in parts by weight:

58 parts of adipic acid 7 parts of a dimer fatty acid (saturated $C_{36}$ fatty acid having a 98% purity)

38 parts of propylene glycol, and 13 parts of 2-ethylhexanol

The mixture was heated at 225° C. for 3 h until its acid value had dropped to below 6. This esterification was carried out in such a way that the reaction water distilled off, and the reactants were not entrained into the distillate. 0.03% of tetrabutyl titanate was then added, the sample temperature of 225° C. was maintained, and the pressure was reduced to 5 mm Hg. A re-esterification step and the distillation of part of the excess alcohol ensued simultaneously here. These conditions were maintained until the viscosity of the resulting polyester had risen to about 4.5 Pa.sec at 25° C. The polyester mixture obtained was found to have an acid value of 0.2 and a hydroxyl value of 19.

The polyester mixture obtained here, which still contained some relatively low-molecular ester constituents, was then subjected to molecular distillation at 225° C. under vacuum of 0.005 mm Hg. The distillate amounted to 5.6 wt. % of the total polyester mixture subjected to distillation and mainly consisted of short-chain polyesters with a molecular weight of up to about 800.

The molecular-weight distribution of the polyester mixture was determined by gel-permeation chromatography both before and after the molecular distillation. The curves thus obtained, which are shown in FIG. 1, indicate that the finished polyester mixture (UNI1.RI), which had an acid value of 0.2 and a hydroxyl value of 15, was virtually free of short-chain polyesters, containing at most 2.0% of polyesters with a molecular weight of less than 800. As the data in Table 1 show, this ensured a greatly reduced volatility in the open-cup test.

This polyester mixture was used to produce a PVC sheet containing 66 parts (p.h.r.) of polyester per hundred parts of PVC and additives. The volatility, which was determined, indicated that the other additives also play a part here.

EXAMPLE 2

A mixture with the following composition was made up:

85 parts of adipic acid 21 parts of a dimer acid (saturated $C_{35}$ acid having a 98% purity), and 59 parts of propylene glycol.

The mixture was esterified and re-esterified as described in Example 1. The target viscosity for the end of the re-esterification was 40 Pa.sec at 25° C. The resulting polyester mixture had an acid value of 0.3 and a hydroxyl value of 31.

The molecular distillation was also carried out as in Example 1, but the temperature was now 245° C. The distillate amounted to about 4 wt. % of the starting polyester mixture.

The polyester mixture thus obtained had an acid value of 0.3 and a hydroxyl value of 28 and contained at most 2.0 wt. % of lower polyesters with a molecular weight of up to 800. The drop in the volatility exhibited by the resulting polyester mixture in the open-cup method is shown in Table 1.

EXAMPLE 3

A mixture with the following composition was made up:

58 parts of adipic acid 7 parts of a dimer fatty acid (saturated $C_{36}$ fatty acid having a 98% purity)

36 parts of propylene glycol, and 23 parts of 2-ethylhexanol.

The mixture was esterified and re-esterified as described in Example 1. The target viscosity for the end of the re-esterification was 1.2 Pa.sec at 25° C.

The molecular distillation was also carried out as in Example 1, the distillate amounting to 14.7% of the initial polyester mixture. FIG. 2 shows the curves for the molecular-weight distribution before (UNI4.RI) and after (UNI3.RI) the molecular distillation.

The resulting polyester mixture had an acid value of 0.2 and a hydroxyl value of 16 and contained at most 1.5 wt. % of low-molecular polyesters having a molecular weight of under 800. The volatility was determined by the open-cup method both for this polyester mixture and for a PVC sheet that comprised 66 p.h.r. parts of it (see Table 1).

TABLE 1

| | Weight loss occurring during the volatility test | |
|---|---|---|
| | 1 h at 150° C. (open-cup) | 3 days at 105° C. (0.5-mm-thick PVC sheet with a 66 p.h.r. polyester content) |
| Example 1 | | |
| before mol. dist. | 0.21% | 1.2% |
| after mol. dist. | 0.002 | 0.6% |
| Example 2 | | |
| before mol. dist. | 0.14% | — |
| after mol. dist. | 0.00% | — |
| Example 3 | | |
| after mol. dist. | 0.02% | 0.4% |

Mol. dist. = molecular distillation

I claim:

1. A polyester mixture useful as a plasticizer, said polyester mixture consisting essentially of the reaction product of equivalent amounts of:

a) at least one $C_2$–$C_7$ diol, b) at least one dicarboxylic acid selected from the group consisting of adipic acid, sebacic acid, azelaic acid, phthalic acid, isophthalic acid and terephthalic acid, together with at least one dimer acid selected from the group consisting of the $C_{36}$ to $C_{44}$ dimers of an unsaturated fatty acid, and c) a monofunctional $C_4$–$C_{20}$ compound acting as a chain stopper, said polyester mixture having an acid value of less than 5, a hydroxyl value of less than 35 and an average number molecular weight between 1500 and 10,000, and containing less than 3 wt. % of compounds with a molecular weight of up to 800.

2. A polyester mixture according to claim 1 which contains less than 1.5 wt. % of compounds with a molecular weight of up to 800.

3. A polyester mixture according to claim 1 wherein the average number molecular weight is between 2000 and 8000.

4. A process for the manufacture of a polyester mixture useful as a plasticizer which comprises esterifying and/or re-esterifying a reaction mixture consisting essentially of approximately equivalent quantities of:

a) at least one $C_2$–$C_7$ diol, b) at least one dicarboxylic acid selected from the group consisting of adipic acid, sebacic acid, azelaic acid, phthalic acid, isophthalic acid and terephthalic acid, together with at least one dimer acid selected from the group consisting of the $C_{36}$ to $C_{44}$ dimers of an unsaturated fatty acid, and c) a monofunctional $C_4$–$C_{20}$ compound acting as a chain stopper, until a polyester mixture is obtained having an acid value of less than 5, a hydroxyl value of less than 35 and an average number molecular weight between 1500 and 10,000 and subsequently removing a 4–25 wt. % fraction of lower esters with a molecular weight up to 800 by molecular distillation from the polyester mixture.

5. A process for the manufacture of a plasticized resin composition, characterized in that a resin composition is prepared comprising 10 to 40 wt. % of a polyester mixture as claimed in any one of claims 1, 2 and 3.

6. A plasticized resin composition, characterized in that the resin composition comprises 10 to 40 wt. % of a polyester mixture as claimed in any one of the preceding claims 1, 2 and 3.

7. Shaped objects usable as components in cars, characterized in that the objects at least partly consist of a polyester mixture according to claim 6.

* * * * *